United States Patent
Szoke et al.

(10) Patent No.: US 11,328,299 B2
(45) Date of Patent: May 10, 2022

(54) METHOD AND SYSTEM FOR TRANSACTION AUTHORIZATION BASED ON A PARALLEL AUTONOMOUS CHANNEL MULTI-USER AND MULTI-FACTOR AUTHENTICATION

(71) Applicant: ID GLOBAL SOLUTIONS CORPORATION, Longwood, FL (US)

(72) Inventors: Thomas Szoke, Longwood, FL (US); Maxim Umarov, Longwood, FL (US)

(73) Assignee: IPSIDY, INC., Long Beach, NY (US)

(*) Notice: Subject to any disclaimer, the term of this patent is extended or adjusted under 35 U.S.C. 154(b) by 318 days.

(21) Appl. No.: 15/751,584

(22) PCT Filed: Aug. 10, 2016

(86) PCT No.: PCT/US2016/046332
§ 371 (c)(1),
(2) Date: Feb. 9, 2018

(87) PCT Pub. No.: WO2017/027580
PCT Pub. Date: Feb. 16, 2017

(65) Prior Publication Data
US 2018/0240121 A1    Aug. 23, 2018

Related U.S. Application Data

(60) Provisional application No. 62/203,024, filed on Aug. 10, 2015.

(51) Int. Cl.
*G06Q 20/40* (2012.01)
*G06Q 30/02* (2012.01)
(Continued)

(52) U.S. Cl.
CPC ....... *G06Q 20/40145* (2013.01); *G06Q 20/34* (2013.01); *G06Q 20/3674* (2013.01);
(Continued)

(58) Field of Classification Search
CPC ........ G06Q 20/00–425; H04L 9/00–38; H04L 2463/00–082
See application file for complete search history.

(56) References Cited

U.S. PATENT DOCUMENTS

2005/0027543 A1* 2/2005 Labrou ................. G06Q 20/12
705/26.35
2006/0173776 A1* 8/2006 Shalley ................. G06Q 30/06
705/39

(Continued)

OTHER PUBLICATIONS

International Search Report, dated Oct. 20, 2016.
Written Opinion of the International Searching Authority, dated Oct. 20, 2016.

*Primary Examiner* — John W Hayes
*Assistant Examiner* — Chenyuh Kuo
(74) *Attorney, Agent, or Firm* — Bay State IP, LLC (57) ABSTRACT

A system for authorizing electronic transactions using a form of a token possessing credentials of an account holder, wherein the system transmits a verification message to a terminal where this terminal is different from the one the electronic transaction is conducted on, and through this combination the system shall verify that the transaction is being conducted by the authorized owner of the token used.

10 Claims, 6 Drawing Sheets

(51) Int. Cl.
*G06Q 20/32* (2012.01)
*G06Q 20/34* (2012.01)
*G06Q 20/38* (2012.01)
*G06Q 20/42* (2012.01)
*H04L 9/32* (2006.01)
*G06Q 20/36* (2012.01)

(52) U.S. Cl.
CPC ......... G06Q 20/38 (2013.01); G06Q 20/3825 (2013.01); G06Q 20/40 (2013.01); G06Q 20/425 (2013.01); H04L 9/3215 (2013.01); H04L 9/3234 (2013.01); H04L 9/3247 (2013.01); *H04L 2463/082* (2013.01)

(56) References Cited

U.S. PATENT DOCUMENTS

| | | | | |
|---|---|---|---|---|
| 2009/0106556 A1* | 4/2009 | Hamid | ............... | H04L 63/18 |
| | | | | 713/176 |
| 2012/0079581 A1* | 3/2012 | Patterson | ............. | G06Q 20/206 |
| | | | | 726/7 |
| 2013/0346294 A1* | 12/2013 | Faith | .................... | G06F 21/552 |
| | | | | 705/39 |
| 2014/0095404 A1* | 4/2014 | Hines | ................ | G06Q 30/0207 |
| | | | | 705/329 |
| 2015/0161596 A1* | 6/2015 | McCarthy | ............ | G06Q 20/204 |
| | | | | 705/67 |

\* cited by examiner

METHOD AND SYSTEM FOR TRANSACTION AUTHORIZATION BASED ON A PARALLEL AUTONOMOUS CHANNEL MULTI-USER AND MULTI-FACTOR AUTHENTICATION

CROSS REFERENCE TO RELATED APPLICATION

This application is for entry into the U.S. National Phase under § 371 for International Application No. PCT/US2016/046332 having an international filing date of Aug. 10, 2016, and from which priority is claimed under all applicable sections of Title 35 of the United States Code including, but not limited to, Sections 120, 363, and 365(c), and which in turn claims priority under 35 USC 119 to U.S. patent application No. 62/203,024 filed on Aug. 10, 2015.

BACKGROUND OF THE INVENTION

Field of the System

The present system and method pertain to electronic transactions and more particularly to a secure method of authorization an electronic transaction through a multi-factor verification process.

Description of Concurrent Art

The current method to perform electronic transactions normally utilize hardware tokens, such as chip or magnetic stripe cards to identify the account of a party involved in the transaction. It may also be used for security purposes as "something-you-have" for their first factor authentication method.

In the case of online transactions, the "something-you-have" authentication is actually used as "something-you-know" authentication, compromising the security of the transaction.

For additional security measures, current transaction methods utilize something called a Card Holder Verification method, which requires the holder of the token to enter information that would only be available to the holder of the token. This is done in the current system by having the additional verification information entered into the same channel as the transaction being conducted.

In chip-and-pin transactions the PIN is entered into the terminal that originated the transaction.

Online purchase secured by 3-D secure implementation (Verified by Visa, MasterCard SecureCode, American Express SafeKey, etc) include password or one-time codes which are entered into the application being displayed on a browser running on the same device.

Online wire transfers or banking can use a one-time password provided to an external device, however that password must then be directly entered into the application being displayed on the same browser running on the same device.

SUMMARY OF THE INVENTION

The instant series of system, method and series of apparatuses, as illustrated herein, are clearly not anticipated, rendered obvious, or even present in any of the prior art mechanisms, either alone or in any combination thereof. Thus the several embodiments of the instant apparatus are illustrated herein.

Briefly stated, in one embodiment, the present system contemplates a secure method of authorizing a transaction by having a unique identifier routed through the transaction processing system triggering autonomous independent channel (out-of-band) multi-factor multi-user identity verification(s).

In one embodiment, the transaction data or its direct derivative will be injected into the out-of-band communication channel with the unique identifier.

The transaction authorization may consist of one or more sub-authorizations (multi-user) in order for the full transaction authorization to be completed.

Each sub-authorization requires the designated user to successfully complete a multi-factor authentication; where the user may or may not be a transaction originator.

The multi-factor authentication may be provided through specialized combinations of including, but not limited to: codes, biometrics, and/or digital signatures.

In an additional embodiment, an account owner (i.e. the rightful owner of the credentials associated with a physical token) may be represented by a collective and the corresponding identity verification response may be either: a logical sum of individual responses OR a response from an individual selected from the collective based on the policy of a verification process owner. In one embodiment, the policy of the verification process owner may be determined based on the transaction data details.

In this invention the out-of-band channel may be defined as either a completely separate device using a completely separate communications channel or it can be the same physical device using the same communications channel but by a completely independent application and associated backend service.

This invention allows the system performing the transaction to not have to participate in the additional transaction authorization mechanism that has been triggered, thus greatly simplifying deployment of the multi-factor authentication solution. As a result the invention allows for the same type of multi-factor multi-user verification(s) to be performed in both card present (when the person performing the transaction is physically at the transaction location) and card not present (when the person is performing a transaction on-line) transactions.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

The configuration of the present system provides the average consumer with an additional layer of security against unauthorized transactions.

In one embodiment, a method for authorizing a transaction based on a parallel autonomous multi-factor authentication is disclosed, wherein the method utilizes a transaction processing system. Preferably, the transaction processing system operates initially by obtaining a physical token to originate a transaction by a transactor and then transmitting a plurality of credentials contained within the physical token to a transaction platform. The transaction platform communicates the credentials to a transaction process owner to verify the account owner to determine whether to authorize the transaction. Separately, and in conjunction with the transaction process owner, a verification process owner is automatically activated by the credentials associated with the physical token.

In this embodiment, the transaction processing system conducts a parallel authentication of an account owner by the transaction process owner and the verification process owner. Upon receiving responses from the transaction process owner and the verification process owner as to the verification and authorization of the transaction, the transaction platform will combine their responses. Finally, the combined response, if containing authorizations from the verification process owner and the transaction process owner, will authorize the transaction by a transactor.

In another embodiment, the parallel autonomous multi-factor authentication includes transmitting an identity verification request to the account owner by the verification process owner. In turn, the account owner, in response to the identity verification request provides a plurality of identity verification data by the account owner to help verify the account owner by the verification process owner.

There has thus been outlined, rather broadly, the more important features of the payment verification/authentication system in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which: Having thus described the system in general terms, reference will now be made to the accompanying drawings, which are not necessarily drawn to scale, and wherein.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
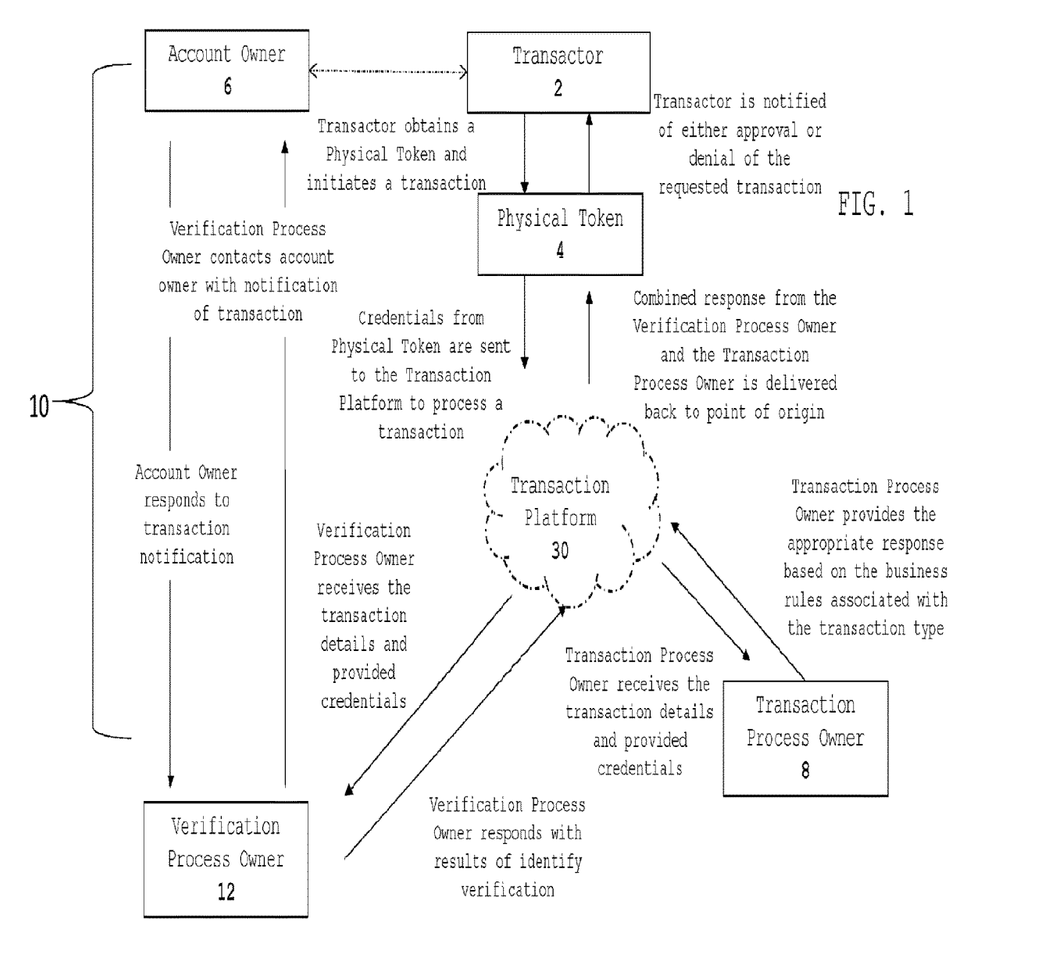
FIG. 1 illustrates a block diagram of an exemplary distributed computer system and networked environment for implementation of instant system and method.

Turning now descriptively to the drawings, FIG. 1 illustrates a block diagram of one embodiment of a transaction processing system 10 for verifying an electronic transaction. In this embodiment, a transactor 2 originates a transaction utilizing a physical token 4 obtained from an account owner 6 of the physical token 4. In a preferred embodiment, the physical token 4 is a device or card that contains credentials used in the processing of the transaction, wherein the credentials from the physical token 4 are linked to the account holder 6. Once, the credentials of the physical token 4 are received by the transactor 2, the credentials are sent to a transaction platform 30. The transaction platform 30 is the platform that the transaction is being conducted through (i.e. a credit card processing company), wherein the transaction platform 30 is in data communication with a transaction process owner 8 who manages the transaction requests and responds based on its pre-defined business rules. In a preferred embodiment, while the transaction platform 30 is in data communication with the transaction process owner 8, a verification process owner 12 is automatically activated by the credentials associated with the physical token 4 utilized by the transactor 2.

In one embodiment, the verification process owner 12 is in data communication with the account owner 6 and to autonomously verify the identity of the account owner 6 to confirm that the account owner 6 and the transaction 2 authorize the transaction being processed. Once the transaction platform 30 has received information from the transaction process owner 8 and the verification process owner 12 the transaction platform 30 transmits a message back to the transactor 2 to either approve or deny the transaction.

Figure 2:
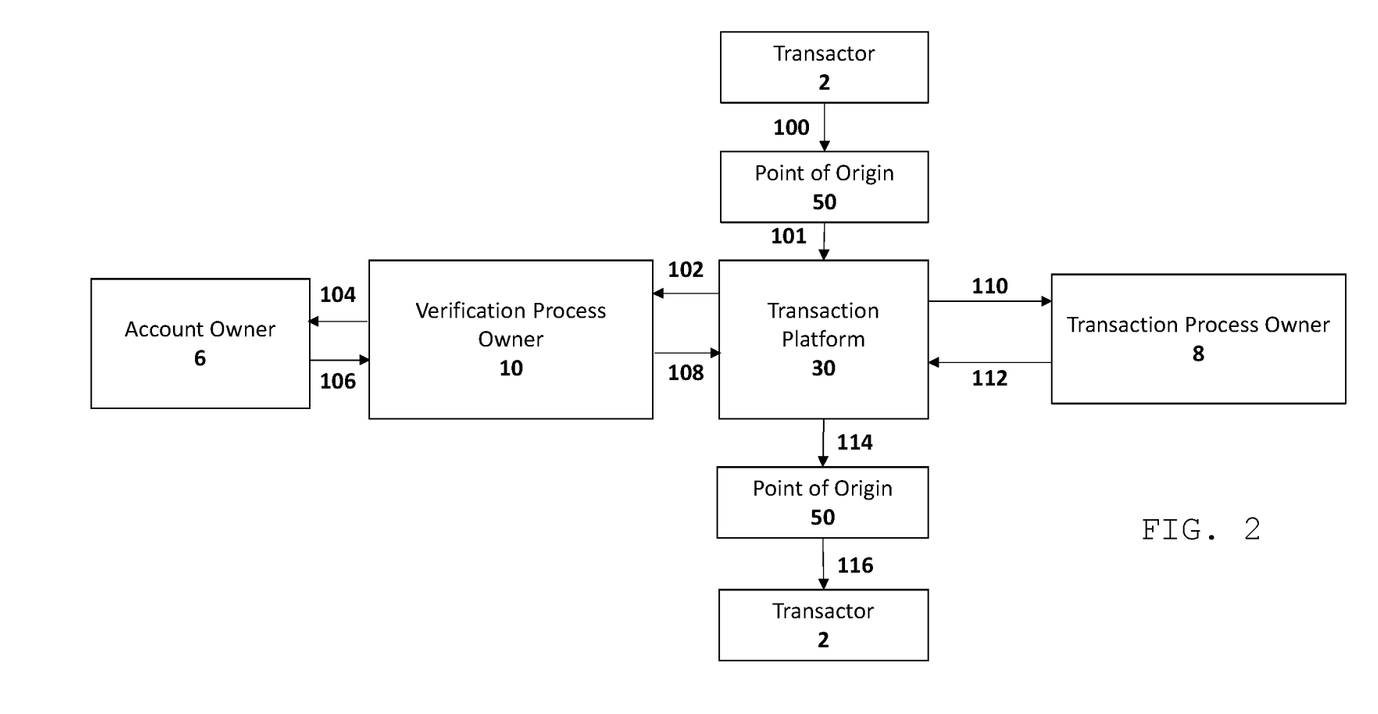
FIG. 2 illustrates a block diagram of the communication between the components in the system.

FIG. 2 illustrates a flow diagram of an embodiment of the data analysis performed by the transaction processing system 10. At step 100 the transactor 2 obtains a physical token 4 that is utilized at a point of origin 50; the point of origin 50 is in electronic and data communication with the transaction platform 30. At step 101 the point of origin 50 initiates the transaction in the transaction platform 30 with transaction data and the credentials associated with the physical token 4. At step 102 the transaction platform 30 communicates the transaction details and the credentials provided by the physical token 4 to the verification process owner 10.

At step 104 the verification process owner 12 is automatically activated by the credentials associated with the physical token 4 sends an identity verification request to the account owner 6. In this embodiment, the verification process owner initiates an autonomous identify verification request to the account owner 6 to verify that the account owner 6 is authorized the transaction initiated at step 100 by the transactor 2. In one embodiment, the identity verification request is transmitted as a unique code to the account owner 6 associated with the credentials provided by the physical token 4. Preferably the identity verification request is sent to the account owner's 6 mobile device, however in other embodiments the request is sent to the account holder's personal computer or an online accessible account associated with the account holder 6.

At step 106 the account owner 6 responds to the identity verification request transmitted by the verification process owner 12 by providing a plurality of personal codes, biometrics and/or digital signatures which are combined with the unique code that were transmitted to the account owner 6. The combined response by the account owner 6 to the verification process owner 12 verifies the identity of the account owner 6 and authorizes the transaction initiated by the transactor 2. In other embodiments, the account holder 6 may also respond with a message that either authorizes or denies the transaction.

At step 108 the verification process owner 12 provides the transaction platform 30 with a response based on the response, or lack thereof, from the account holder 6.

At step 110, while the verification process owner 12 is attempting to verify the account owner 6, the transaction platform communicates the transaction details and the provided credentials from the physical token 4 to the transaction process owner 8. The transaction process owner 8 processes the information received from the transaction platform 30 based on pre-determined business rules.

At step 112 the transaction process owner 8 responds to the transaction platform 30. The transaction process owner 8 response will either approve or deny the transaction based on pre-determined business rules.

At step 114 the transaction platform combines the responses from the verification process owner 12 and the transaction process owner 8 and sends the appropriate response to the point of origin 50. The appropriate response will only be an approval if the response from both the verification process owner 12 and the transaction process owner 8 is that the transaction is authorized. If the transaction is denied by either the verification process owner 12 or the transaction process owner 8 the response for the transaction platform 30 will be a denial. The point of origin 50 notifies the transactor 2 of whether the transaction is approved or denied.

Figure 3:
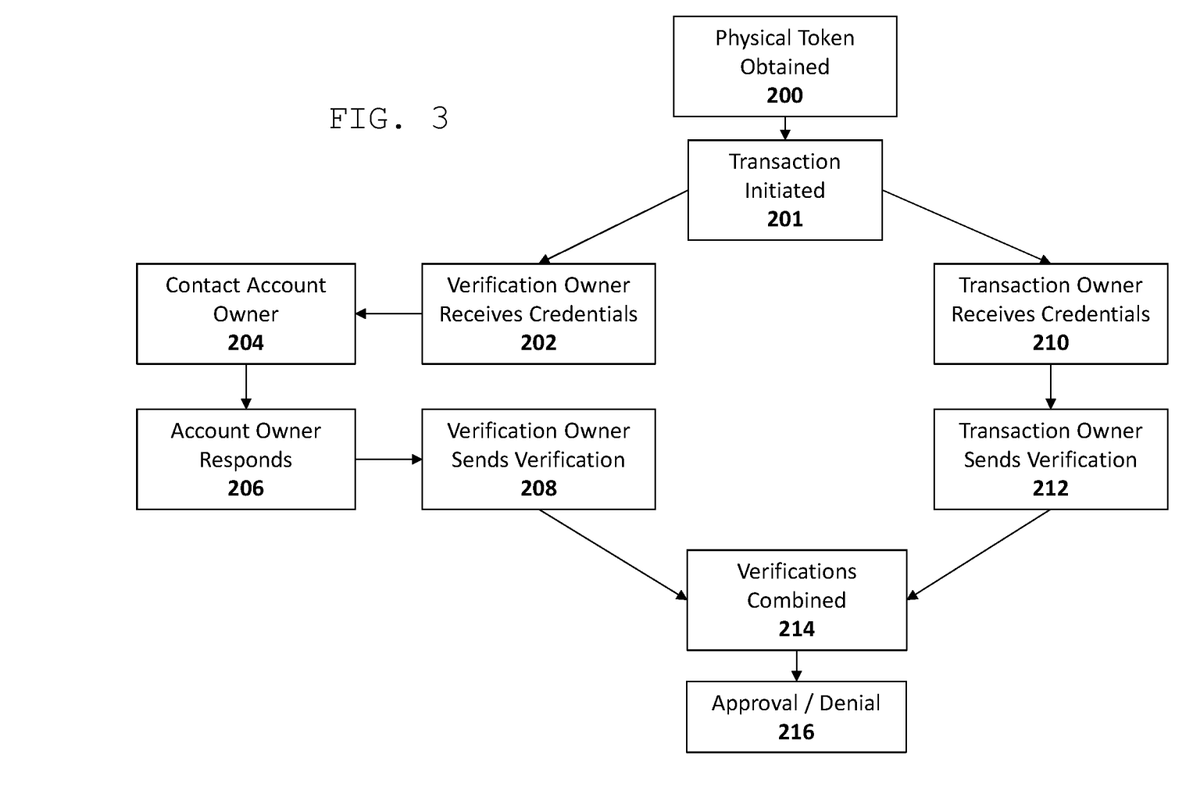
FIG. 3 illustrates a flow diagram of the data analysis performed by the system.

FIG. 3 illustrates a flow diagram of one embodiment for the authorization of a transaction by the transaction processing system 30. Initially, at step 200 the credentials from a physical token 4 are obtained by a transactor 2 at a point of origin 50. At step 201 the point of origin 50 initiates a transaction by transmitting the credentials from the physical token 4 and the transaction details to the transaction platform 30.

At step 202 the transaction platform 30 sends the credentials from the physical token 4 and the transaction details to the verification process owner 12. At step 204 the verification process owner 12 identifies the account owner 6 associated with the credentials from the physical object 4 and asks the account owner 6 whether they approve of the transaction. At step 206 the account owner 6 responds to the verification process owner 12 with an identification confirmation and either an approval or a denial of the transaction. At step 208 the verification process owner 8 sends a verification signal to the transaction platform 30 with the approval, denial, or failed identification from the account owner 6.

At step 210 the transaction platform 30 sends the credentials from the physical token 4 and the transaction details to the transaction process owner 8. The transaction process owner 8 processes the transaction details based on pre-determined business rules to determine whether the transaction is approved or denied. At step 212 the transaction process owner 8 sends a verification response to the transaction platform 30 either approving or denying the transaction based on pre-determined business rules.

At step 214 the transaction platform combines the verification responses from the transaction process owner 8 and the verification process owner 8. If both verification responses approve the transaction the combination will result in a transaction approval. If the combination of the verifications fails to collect approvals from both the transaction process owner 8 and the verification process owner 8, the combination will result in a denial. At step 216 the transaction platform 30 sends the result of the combination to the point of origin 50.

Figure 4:
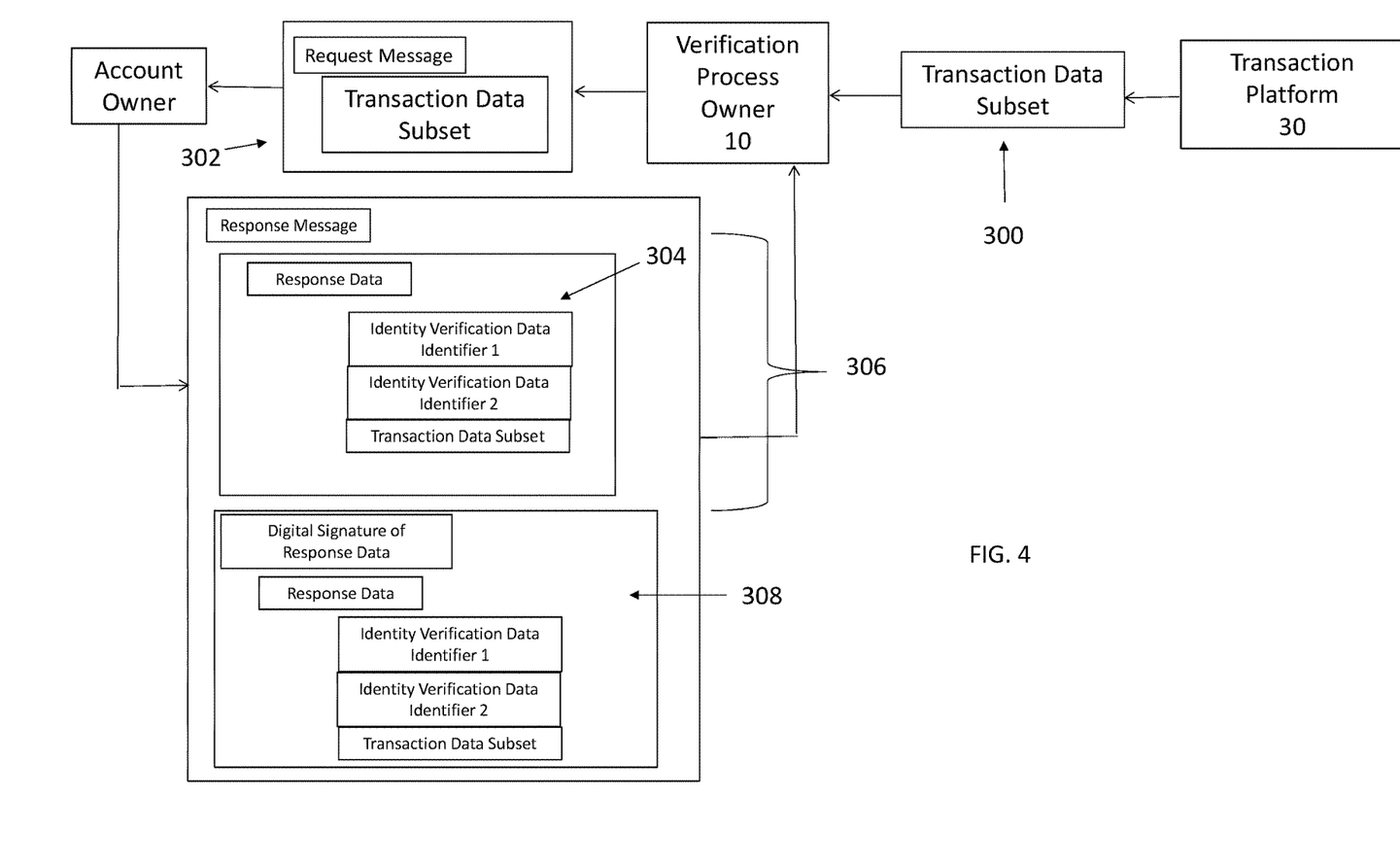
FIG. 4 illustrates a block diagram of one embodiment where a transaction platform delivers transaction details data to a verification process owner.

FIG. 4 illustrates an alternate embodiment of the communication between the account owner 6 and the verification process owner 12 to authorize an initiated transaction.

In this embodiment, the transaction Platform 30 delivers a set of transaction details data 300 or a subset thereof to the verification process owner 12. Following the delivery of the transaction details data 300, the verification process owner 12 subsequently transmits an identity verification request message 302, wherein the identity verification request message 302 also includes the transaction details data 300 or its subset, such that account owner 6 is able to inspect the transaction details data 300 before making a positive or negative authorization decision.

In this embodiment the account owner 6 may respond to verification process owner 12 by providing a plurality of identity verification data 304 which includes, but is not limited to: a personal code, a biometric identifier or a derivative thereof. The identify verification data is 304 is combined with the Transaction Details Data 300 subset, and the indicator of positive of negative Authorization decision by the account owner 6. This produces a combined response message 306 which contains the account owner 6 identity verification data 304 together with transaction details 304 and a digital signature 308 or signatures of the full message or certain parts of the message.

This embodiment only makes the identity verification valid in the context of the specific transaction initiated and the transaction authorization is only valid if the identity of the account owner whose physical token was utilized to initiate the transaction is verified. This methodology effectively combines the data used for Authentication, the response providing Authorization and confirmation that Authorization is linked to a specific event (transaction) in one response message 306. The message itself when stored provides an Audit trail of the Authentication and Authorization.

Figure 5:
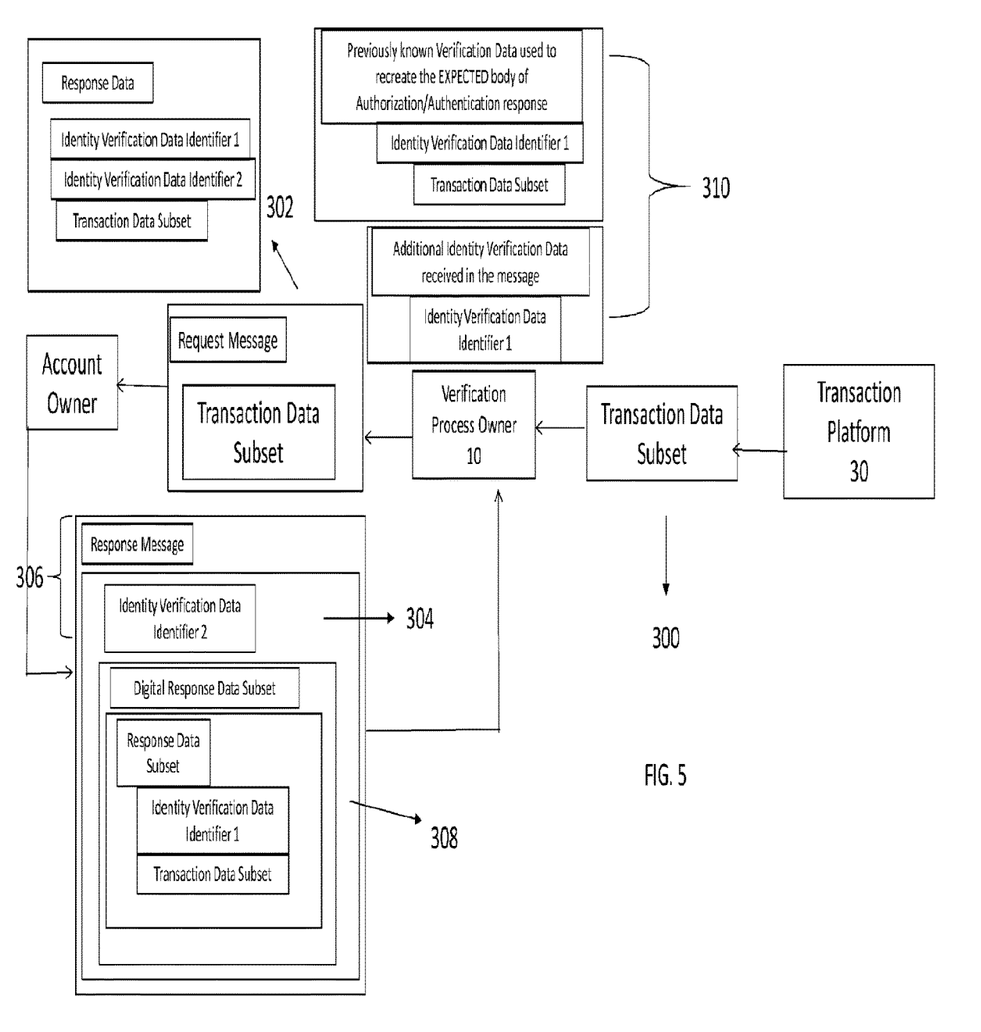
FIG. 5 illustrates a block diagram of one embodiment wherein the verification process owner combines the transaction details and identity verification data of an account owner.

FIG. 5 illustrates an alternate embodiment wherein the identity verification data 304 or derivative thereof of the account owner 6 is only present within the digital signature 308 of the response message 306. In this embodiment the verification process owner 12 must combine a set of previously known transaction details 310 and previously known identity verification data of the account owner 6 or a part thereof to verify the digital signature 308 of the response message 306 without the need to obtain (receive) the body of the message from the account owner 6, as the verification process owner 12 may recreate the body of the response message 306 based on the verification process owner's 12 previous knowledge. This allows the account owner 6 and the verification process owner to complete a combined Authentication/Authorization process using a derivative of the identity verification data 304. The advantages of this embodiment, include that the identity verification data 304 remains secure even if the communication channel is compromised. Also, the amount of data messages and the size of the messages transmitted back to the verification process owner 12 is minimized making this embodiment suitable for real-time implementation even over data links with slow speed and high latency.

Figure 6:
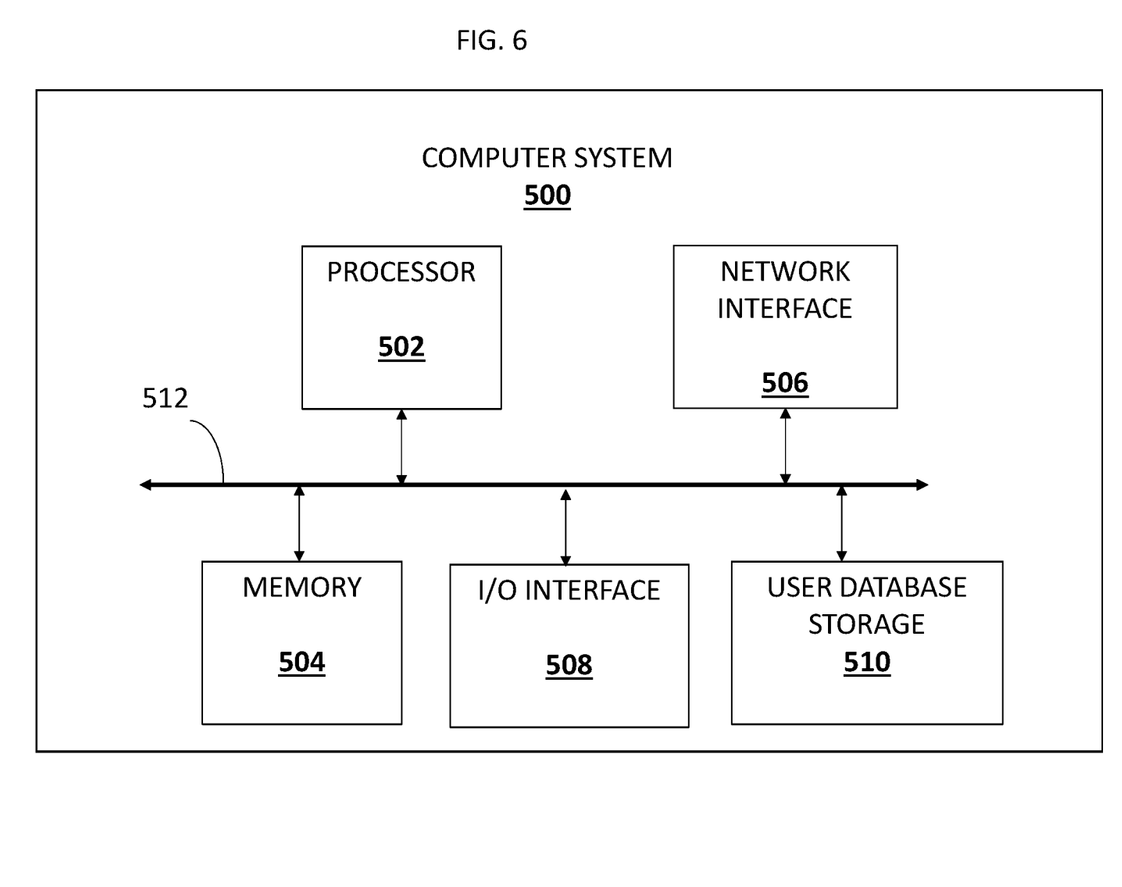
FIG. 6 illustrates one embodiment of an exemplary computing system, wherein the systems and methods disclosed herein may be implemented using one or more computer systems.

FIG. 6 illustrates an exemplary embodiment of a computer system 500, wherein the systems and methods disclosed herein may be implemented using one or more computer systems. As shown, the computer system 500 can include one or more processors 502 which can control the operation of the computer system 500. The processor(s) 502 can include any type of microprocessor or central processing unit (CPU), including programmable general-purpose or special-purpose microprocessors and/or any one of a variety of proprietary or commercially available single or multi-processor systems. The computer system 500 can also include one or more memories 504, which can provide temporary storage for code to be executed by the processor(s) 502 or for data acquired from one or more users, storage devices, and/or databases. The memory 504 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies. The various elements of the computer system 500 can be coupled to a bus system. The bus system can be any one or more separate physical busses, communication lines/interfaces, and/or multi-drop or point-to-point connections, connected by appropriate bridges, adapters, and/or controllers. The computer system 500 can also include one or more network interface(s) 506, one or more input/output (IO) interface(s) 508, and one or more storage device(s) 510. The network interface(s) 506 can enable the computer system 500 to communicate with remote devices (e.g., other computer systems) over a network, and can be, for example, remote desktop connection interfaces, Ethernet adapters, and/or other local area network (LAN) adapters. The IO interface(s) 508 can include one or more interface components to connect the computer system 500 with other electronic equipment. For example, the IO interface(s) 508 can include high speed data ports, such as USB ports, 1394 ports, etc. Additionally, the computer system 500 can be accessible to a human user, and thus the IO interface(s) 508 can include displays, speakers, keyboards, pointing devices, and/or various other video, audio, or alphanumeric interfaces. The storage device(s) 510 can include any conventional medium for storing data in a non- volatile and/or non-transient manner. The storage device(s) 510 can thus hold data and/or instructions in a persistent state (i.e., the value is retained despite interruption of power to the computer system 500). The storage device(s) 510 can include one or more hard disk drives, flash drives, USB drives, optical drives, various media cards, and/or any combination thereof and can be directly connected to the computer system 500 or remotely connected thereto, such as over a network.

The elements illustrated in FIG. 6 can be some or all of the elements of a single physical machine. In addition, not all of the illustrated elements need to be located on or in the same physical or logical machine. Rather, the illustrated elements can be distributed in nature, e.g., using a server farm or cloud-based technology. Exemplary computer systems include conventional desktop computers, workstations, minicomputers, laptop computers, tablet computers, PDAs, mobile phones, and the like. Although an exemplary computer system is depicted and described herein, it will be appreciated that this is for sake of generality and convenience. In other embodiments, the computer system may differ in architecture and operation from that shown and described here.

What is claimed is:

1. A method, for authorizing a transaction based on a parallel autonomous multi-factor authentication of an account holder associated with the transaction, using a transaction processing system comprising a transactor, a transaction platform, a transaction process owner and a verification process owner, the method comprising:

initiating, by the transactor, the transaction, wherein the initiating the transaction further comprises obtaining a token of the account owner for the transaction, wherein the token comprises a plurality of credentials associated with the account owner;

transmitting, by the transactor to the transaction platform, the plurality of credentials of the token and transaction data associated with the transaction;

communicating, by the transaction platform with the transaction process owner, the plurality of credentials associated with the token and the transaction data to the transaction process owner;

determining, by the transaction process owner, authorization of the transaction by processing the plurality of credentials associated with the token and the transaction data, wherein the determining further comprises sending a first response to the transaction platform, wherein the first response comprises a first approval of the transaction;

communicating, by the transaction platform with the verification process owner, the plurality of credentials associated with the token and the transaction data, wherein the communicating with the verification process owner further comprises:

activating the verification process owner via the plurality of credentials associated with the token;

transmitting, by the activated verification process owner, an identity verification request to the account owner, wherein the identity verification request comprises a subset of the transaction data;

receiving, by the activated verification process owner, a response message from the account owner in response to the identity verification request, wherein the response message comprises identity verification data from the account owner and an indicator of authorization of the transaction from the account owner;

verifying, by the activated verification process owner, the account owner using the identity verification data and the indicator from the received response message, wherein the verifying further comprises sending a second response to the transaction platform, wherein the second response comprises a second approval of the transaction;

receiving, by the transaction platform, a second response from the verification process owner and the first response from the transaction process owner, wherein the receiving the first and second responses further comprises combining the first and second responses;

determining, by the transaction platform, whether (A) the first response from the transaction process owner includes the first approval of the transaction, and (B) the second response from the verification process owner includes the second approval of the transaction;

authorizing, by the transaction platform, the transaction based on determining that (A) the first response from the transaction process owner includes the first approval of the transaction, and (B) the second response from the verification process owner includes the second approval of the transaction; and sending, by the transaction platform to the transactor, a message of the authorized transaction.

2. The method for authorizing a transaction based on a parallel autonomous multi-factor authentication of claim 1, wherein the response message from the account owner further comprises a digital signature of the account owner.

3. The method for authorizing a transaction based on a parallel autonomous multi-factor authentication of claim 1 wherein, the plurality of credentials is stored in the token.

4. The method for authorizing a transaction based on a parallel autonomous multi-factor authentication of claim 1, wherein the transaction platform is in data communication with the transaction process owner.

5. The method for authorizing a transaction based on a parallel autonomous multi-factor authentication of claim 1, wherein the determining the authorization of the transaction comprises determining, by the transaction process owner, authorization of the transaction by processing the plurality of credentials associated with the token and the transaction data based on its pre-defined business rules.

6. The method for authorizing a transaction based on a parallel autonomous multi-factor authentication of claim 1, wherein the verification process owner is in data communication with the account owner.

7. The method for authorizing a transaction based on a parallel autonomous multi-factor authentication of claim 1, wherein the identity verification request transmitted by the verification process owner to the account owner further comprises a unique code.

8. The method for authorizing a transaction based on a parallel autonomous multi-factor authentication of claim 1, wherein the transmitting the identify verification request to the account owner comprises transmitting the identity verification request to a mobile device of the account owner.

9. The method for authorizing a transaction based on a parallel autonomous multi-factor authentication of claim 2, wherein the identity verification data provided by the account owner is selected from the group consisting of: a plurality of personal codes, biometrics, and digital signatures.

10. The method for authorizing a transaction based on a parallel autonomous multi-factor authentication of claim 7, wherein the response message from the account owner to the verification process owner comprises a combination of the unique code and the identity verification data.

\* \* \* \* \*